W. H. Startzman,
Hoe Handle,
No. 62,900. Patented Mar. 12, 1867.
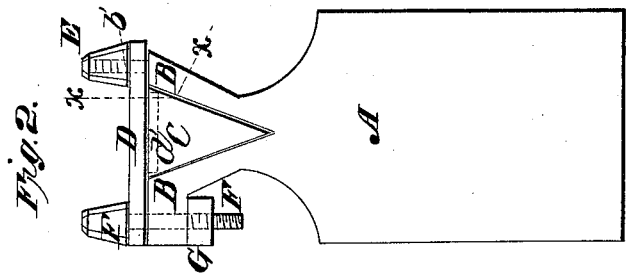
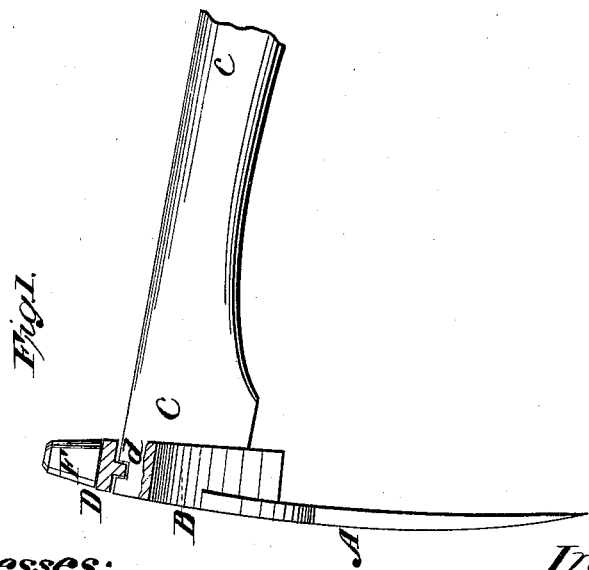
Witnesses:
Theo Tusche.
J. A. Service.
Inventor:
William H. Startzman.
Per Munn & Co.
Attorneys.

United States Patent Office.

WILLIAM H. STARTZMAN, OF BIG LICK, VIRGINIA.

Letters Patent No. 62,900, dated March 12, 1867.

---

IMPROVED METHOD OF ATTACHING HOES TO THEIR HANDLES.

---

The Schedule referred to in these Letters Patent and making part of the same.

---

TO ALL WHOM IT MAY CONCERN:

Be it known that I, WILLIAM H. STARTZMAN, of Big Lick, in the county of Roanoke, and State of Virginia, have invented a new and useful Improvement in Hoes; and I do hereby declare that the following is a full, clear, and exact description thereof, which will enable others skilled in the art to make and use the same, reference being had to the accompanying drawings, forming part of this specification, in which—

Figure 1 is a side view of my improved hoe, partly in section, through the line $x$ $x$, fig. 2.

Figure 2 is a bottom view of the same.

Similar letters of reference indicate like parts.

My invention has for its object to furnish an improved manner of attaching the handle to the blade of the hoe; and it consists in constructing the eye of the hoe with a wedge-shaped notch for the reception of the handle, and in making the end of the handle wedge-shaped and securing it in the wedge-shaped notch of the eye by a cap and hollow nuts or bolts, as hereinafter more fully described.

A is the blade of the hoe, to the rear edge of which is attached, or upon it is formed, an eye, B, in which is formed a wedge-shaped notch for the reception of the handle. C is the handle, the lower end of which is made wedge-shaped, as shown in fig. 2, so as to fit into the notch formed in the edge B. D is a cap, which passes across the rear side of the handle C, from one side of the eye B to the other, as shown in fig. 2. Upon the under side of the cap D is formed a tongue, $d'$, running longitudinally with the cap, and fitting into a groove formed across the lower end of the handle C, as shown in fig. 1. Upon the sides of the eye B are formed arms, $b'$, having screw-threads cut upon them, which said arms pass through holes formed in the ends of the cap D; and the said cap is secured in place by hollow nuts, E, screwed down upon the said arms $b'$; or holes may be formed through the sides of the eye B, through which, and through the holes in the ends of the cap D, are passed the bolts F, which are secured in place by the nuts G screwed upon their lower ends. Either of these ways of securing the handle in place is very effective; but I prefer the one first described, as giving a neater appearance to the hoe. When the handle is attached to the blade of the hoe in this manner, as the handle shrinks it may be tightened by screwing down the nuts so as to hold it always tight, thus avoiding splitting the handle and weakening it by the insertion of wedges.

What I claim as new, and desire to secure by Letters Patent, is—

Attaching the handle C, having its lower end wedge-shaped, to the hoe A, by means of the wedge-shaped eye B, tongued cap D, nut E, and bolts and nuts F G, as herein shown and described.

WILLIAM H. STARTZMAN.

Witnesses:
J. N. THAXTON,
MATTERSON ROBERSON.